3,084,777
MECHANICALLY OPERATED FRICTION CLUTCH AND BRAKE ASSEMBLY
Albert R. McCallum, Grosse Pointe, Mich., and Philo H. Danly, Chicago, Ill., assignors to Danly Machine Specialties, Inc., Chicago, Ill., a corporation of Illinois
Filed Dec. 17, 1959, Ser. No. 860,259
5 Claims. (Cl. 192—144)

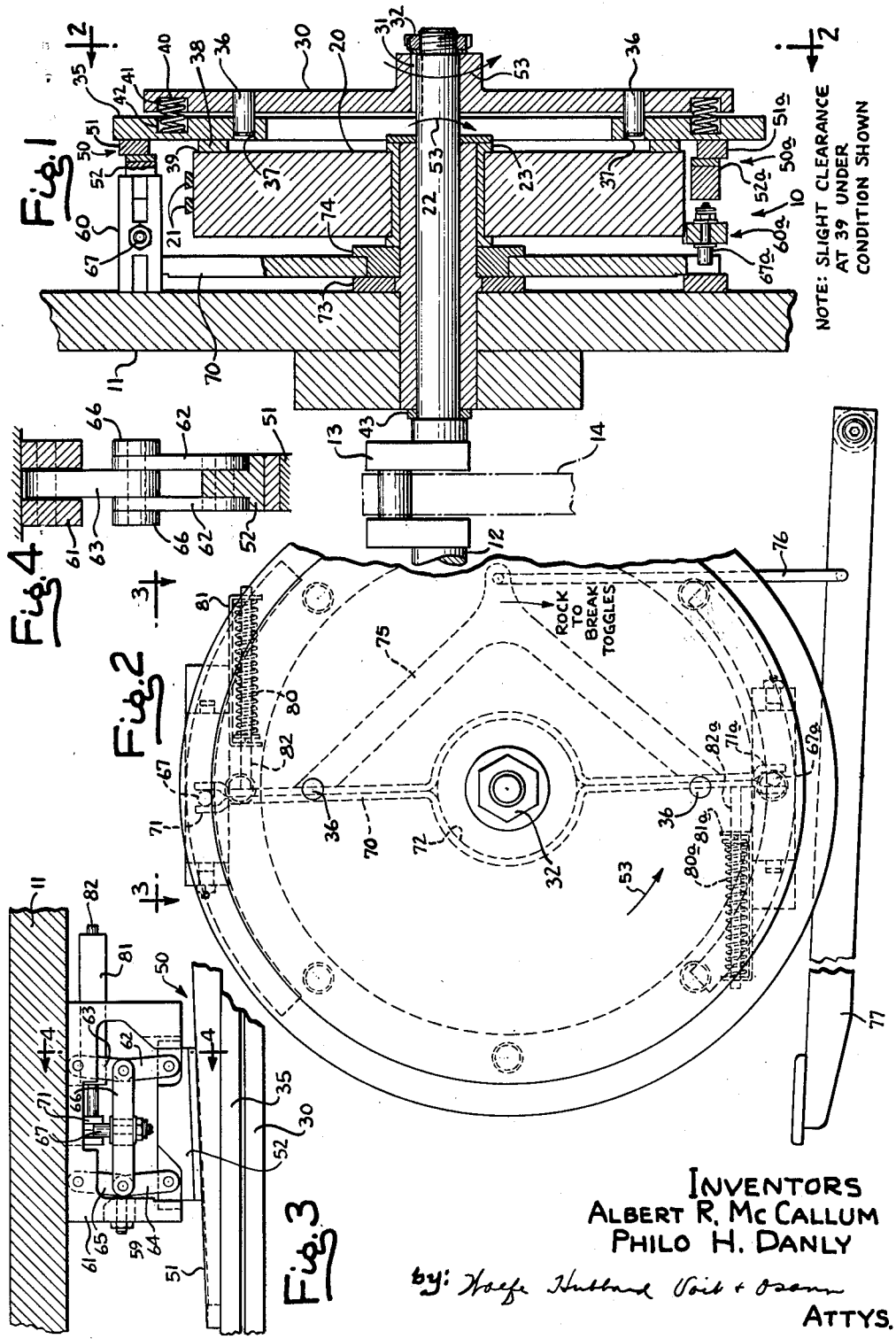

The present invention relates to driving arrangements for presses and more particularly to means for rotating the crankshaft of a press through one or more integral cycles of revolution.

It is an object of the present invention to provide a friction clutch and brake assembly for rotating the crankshaft of a press which may be mechanically operated by a light triggering force, making it possible to cycle the press by direct manual control. It is a related object to provide a friction clutch and brake assembly which is simple and inexpensive, which is particularly well suited for use in presses of small and medium size, free of the expense and complication of servo power actuators conventionally used.

It is another object of the invention to provide a friction clutch and brake assembly which may be operated with light manual force but in which the actual operating forces at the clutch elements are nevertheless at a high level for positive control of large amounts of power. It is a related object to provide a novel clutch and brake assembly in which the energy required to operate the clutch elements is derived from the energy liberated at the brake when the crankshaft is braked to a stop and in which the energy so derived is stored for later reapplication of the clutch. In this connection it is a more specific object to provide a brake having tapered brake shoes together with means for utilizing the retreating movement of one of the shoes which occurs incident to braking for deenergizing the clutch and for compressing a spring. It is another specific object to provide a novel toggle arrangement for mounting at least one of the brake shoes so that the shoe is firmly mounted in interfering position for positive braking yet movable into a temporary, out-of-the-way position by manually braking the toggle over center, thereby to initiate a driving cycle.

It is another object of the invention to provide a clutch and brake assembly which is safe and positive and in which the crankshaft is blocked against continued rotation upon completing a desired operating cycle. Stated in other words, it is an object to provide a device which avoids double cycling or "repeat" following momentary release of the control linkage and a device which is ideally suited to the addition of mechanical latches as further assurance against double cycling where the manual operator is depressed for more than a momentary time interval. In one of its aspects it is an object of the present invention to provide a clutch and brake assembly capable of continuous recycling upon maintaining the manual operator constantly depressed in those instances where continuous rotation of the crankshaft is desired but which will, nevertheless, stop the crankshaft at a predetermined phase position when the manual actuator is released.

Other objects and advantages of the invention will become apparent upon reference to the attached detailed description and to the drawings in which:

FIGURE 1 is a vertical section taken through a clutch and brake assembly constructed in accordance with the present invention as viewed along line 1—1 in FIG. 2 and somewhat simplified to facilitate understanding.

FIG. 2 is a fragmentary end view of the device shown in FIG. 1 viewed along the line 2—2.

FIG. 3 is a fragmentary view of one of the toggle mechanisms viewed along the line 3—3 in FIG. 2.

FIG. 4 is a fragmentary section taken along the line 4—4 in FIG. 3.

While the invention has been described in connection with an exemplary embodiment, it will be understood that the invention is not limited to such embodiment and we intend to cover all of the various alternative and equivalent constructions which may be included within the spirit and scope of the claims appended hereto.

Turning now to FIG. 1, there is shown a clutch and brake assembly 10 incorporating the present invention the assembly being secured to a press frame member 11. Mounted in the frame is a crankshaft 12 having a crank 13 and pitman 14. Since the remainder of the press is conventional as far as the present invention is concerned, the further details of the press, the mounting of the dies, etc. has not been included and will be apparent to one skilled in the art. Concentrically arranged with respect to the crankshaft 12 is a constantly driven flywheel 20 driven by V-belts 21 or the like trained about the periphery of the flywheel and which may be powered by an electric motor. To provide outboard support for the flywheel 20, a stationary quill shaft 22 is employed mounting a flywheel bearing 23. The crankshaft 12 is extended through the quill shaft 22 so that the flywheel is, in effect, telescoped over the end of the crankshaft yet separately rotatable.

For the purpose of clutching the flywheel 20 to the crankshaft 12, a clutch supporting member or plate 30 is provided which is keyed to the crankshaft by means of a key 31 and retained on the shaft by a retaining nut 32 which is lockable in position, the clutch supporting plate carrying a clutch member 35 for engaging the flywheel 20. The clutch member 35 is bodily supported by the plate 30 and rotates with it, with provision being made for limited clutching movement toward and away from the flywheel. As shown, the clutch member is secured to the plate 30 by means of a series of axially extending pins 36 which fit loosely in holes 37 registeringly provided in the clutch member 35. In the present embodiment the clutch member 35 is in the shape of an annulus although, as the discussion proceeds, it will be apparent that this member may take other forms without departing from the present invention. Interposed between the clutch member 35 and the flywheel, and preferably secured to the member 35, is an annulus 38 of clutch facing material of the type commonly employed in brakes and clutches.

For pressing together the clutch faces during a driving cycle, biasing means are interposed between the clutch member 35 and the clutch supporting plate 30. In the present instance the biasing force is provided by a series of coil springs 40 seated in registering depressions 41, 42 in the members 30, 35 respectively. The reaction force of the springs 40 is taken up by the crankshaft 12, with a thrust bearing being provided at any point along the length of the crankshaft. This function may, for example, be served by a thrust collar 43 which prevents rightward movement of the shaft with respect to the frame 11 of the press.

In accordance with the present invention a brake 50 is provided having a first tapered shoe 51 secured to the clutch member 35 and a second tapered shoe 52 which is stationary, i.e., non-rotatable, with respect to the frame of the press, so that the wedging movement of the shoe 51 which occurs upon engagement of the brake shoes produces disengagement of the clutch. Further in accordance with the invention a second brake is provided in a position which is preferably diametrically opposite to the first brake but having shoes which are located at a different radius to insure a full rotative cycle without use of special latches or the like. Thus, as shown in FIG. 1, a second brake 50a is employed having shoes 51a, 52a and located at a radius Ra which is less than the radius R of the first brake. While the operation of the brakes will be spelled out in greater detail when the operation of the overall mechanism is discussed, nevertheless it may be observed at this point that advancement of the clutch supporting plate 30 in the direction indicated by the arrows 53 causes the brake shoes 51, 51a to ride up upon the stationary brake shoes 52, 52a, serving to cam the clutch member 35 to the right as viewed in FIG. 1, thereby overcoming the force of the springs 40 and causing retraction of the clutch facing 38 from the flywheel 20, breaking any further driving connection between them. With the parts occupying the positions shown in FIG. 1 there is slight clearance at 39.

In accordance with one of the features of the present invention, a novel toggle arrangement is interposed between the stationary brake shoes and the frame 11 for the purpose of supporting the brake shoes firmly in an interfering or breaking position while nevertheless enabling the stationary brake shoes to be momentarily retracted by manually breaking the toggle over center thereby to initiate a cycle of rotation of the crankshaft. For this purpose a toggle assembly 60 is used with the brake 50 and a toggle assembly 60a is used with the brake 50a, it being understood that corresponding parts of the toggle assembly 60a will be indicated by numerals with subscript "a." Referring to the toggle assembly 60, it includes a frame 61, a first toggle consisting of elements 62, 63 and a second toggle consisting of elements 64, 65. One end of each of the toggles is anchored to the frame 11 while the other ends are connected to the stationary brake shoe 52. For interconnecting the centers of the toggles, a toggle connecting link 66 is employed having a pin 67 engageable by a yoke to be described for tripping the toggle. As shown in the drawing, the toggle assembly is in the "on center," or braking position with the brake shoe 52 fully extended. As a matter of fact, the toggle is shown engaging a stop slightly past the "on center" position for the sake of stability and to prevent inadvertent tripping of the toggle.

For the purpose of simultaneously breaking both of the toggle assemblies 60, 60a, a yoke 70 is employed having a first fork 71 and a second fork 71a for engaging the connecting links 66, 66a. This yoke is preferably made of two opposed strips of metal with a central opening 72 and rockable in an annular groove formed by annular bearing members 73, 74. For rocking the yoke 70 clockwise, it includes an integral arm 75 to which is attached to pull rod 76 connected to an operating treadle 77.

In order to maintain the toggles "on center" and to maintain the treadle 77 in its upraised position in the absence of any triggering force, each of the toggle assemblies 60, 60a, is provided with a biasing spring assembly. The biasing spring associated with the upper toggle and indicated at 80 is mounted in a bracket 81 which is secured to the press frame and which serves to exert outward pressure against the fork portion 71 of the yoke. The springs 80, 80a may be of relatively light construction so that very little pressure must be applied to the foot treadle 77 to break the toggles and to thereby retract the stationary brake shoes 52, 52a.

While the operation of the device will be apparent from the foregoing, it will be helpful to summarize it briefly as follows. Prior to initiating a cycle of press operation, the parts occupy the positions shown in the drawings. It will be understood that there is a slight amount of clearance at the clutch interface 39 so that continued rotation of the flywheel 20 may take place without applying any drag to the clutch member 35. To initiate the cycle the operator momentarily steps upon the treadle 77. This produces clockwise rocking movement of the yoke 70 which overcomes the biasing force of the toggle springs 80, 80a and breaking both of the toggle assemblies 60, 60a (see dotted position of toggles in FIG. 3). This produces momentary retraction of the stationary brake shoes 52, 52a, thereby releasing the axial pressure upon the clutch member 35 and enabling the clutch member to move to the left (FIG. 1) under the urging of the coil springs 40 until contact takes place at the clutch interface 39. This immediately produces a rotational drag upon the clutch member 35, rotating the moveable brake shoes 51, 51a clear of the stationary brake shoes 52, 52a. With the full force of the springs 40 then available at the clutch faces, substantial torque is transmitted from the flywheel to the clutch member 35 to produce a powerful thrust at the dies of the press.

Upon completion of the downward stroke of the pitman 14, the crank 13 begins to rotate upwardly back to the position shown in FIG. 1 and with the movable brake shoes approaching the stationary brake shoes. The latter are now in obstructing position due to the fact that pressure has been released upon the treadle 77, with automatic resetting of the toggles. As the brake shoes engage one another, braking force is applied to slow the rotation of the crankshaft. Simultaneously and because of the wedging action resulting from the tapered faces of the brake shoes, the clutch members 35 are cammed endwise (to the right in FIG. 1), compressing all of the coil springs 40 and retracting the clutch member 35 to produce clearance at the clutch interface 39. Because the braking force is increasingly applied as the tapered surfaces come together, the crankshaft is braked to a stop within a relatively few degrees and because of the clearance of the clutch faces, the flywheel applies no further drag to the clutch member. This completes a cycle of crankshaft rotation. The flywheel continues to rotate.

The embodiment of the invention described above has been simplified for purposes of easy understanding, and it will be understood that various changes and refinements may be included in a commercial construction without departing from the invention. Thus it is one of the features that in addition to the tangential movement of the movable brake shoe 51 relative to the stationary brake shoe 52 incident to braking, provision is made for utilizing the movement which occurs at 90° to the tangent. In the present instance this movement at 90° is in the axial direction. It will be apparent to one skilled in the art that the invention is not limited to 90° movement in the axial direction but would include 90° movement in the radial direction by the simple expedient of using tapered brake shoes which are arranged radially as, for example, in an automobile brake rather than being arranged side-by-side in the axial direction.

It will be appreciated that one of the important features of the present construction is the inherent safety and reliability. Provided that the foot treadle is operated momentarily to initiate the cycle, i.e., with prompt release, positive stoppage at the end of the cycle is assured without any possibility of a dangerous "repeat." Thus we prefer to use a relatively large angle of taper on the order of two to five degrees so that there is substantial interference between the brake shoes, making it impossible for the movable shoe to slide over the stationary shoe when the toggle is "on center." Preferably the device is so constructed that the clutch member tends to bottom on the clutch supporting plate thereby to limit the axial yielding of the clutch member. By way of example, note in FIG. 1 that the clearance between the members 30, 35 is less than the amount of "overlap" or interference between the brake shoes.

It is a further feature of the device that the braking and clutching forces are balanced and symmetrical. The clutching forces are symmetrical since distributed about the entire periphery of the clutch member and flywheel. The braking forces are symmetrical since substantially identical brakes are used spaced in diametrically opposite positions. In spite of this diametrical spacing, completion of a full cycle is assured since the two brakes are at different radii and the movable shoe of one of them cannot therefore engage the stationary shoe of the other. It is one of the features of the present construction that it is possible to mount the brakes at the same radii provided only that a latching arrangement is employed for inhibiting return movement of the tripping linkage until after the 180° position is reached in the rotation of the crankshaft. Such latch may for example be of the type shown and described in Georgeff Patent No. 2,594,909 which issued on April 29, 1952.

Moreover, it will be apparent to one skilled in the art that the present mechanical clutch and brake assembly forms an extremely compact package, being positioned immediately adjacent the flywheel and occupying only a few inches in each direction beyond the confines of the flywheel. Because of its simplicity, a clutch and brake assembly employing the present invention may be inexpensively constructed and once installed requires little or no maintenance. The high initial cost and other problems associated with servo power actuators of the pneumatic, electrical, and hydraulic types are largely eliminated. The present device is particularly suitable for use in presses in the small and medium sizes although it will be appreciated that the principles are applicable to even the largest presses without any substantial redesign. When employing the present invention in presses of medium and large size, stiffer clutch springs 40 will, of course, have to be employed. However, it should be noted that this does not substantially increase the treadle pressure required to trip the mechanism, since compression of the springs 40 is, in any event, brought about by energy from the decelerating crankshaft and the parts connected to the crankshaft. Thus, assume that the brakes are just beginning to engage. As the movable shoes slide upwardly on the stationary shoes, the clutch member 35 retreats, compressing the springs 40 so that a substantial amount of energy is stored in the springs as the crankshaft comes to a stop. Later, when initiating a subsequent cycle, force need be applied on the treadle only to the extent necessary to compress the relatively light springs 80 so that the toggle begins to break over center. As the toggle passes the dead center position, the energy stored in the springs 40 is released to produce complete and immediate collapsing movement in the toggle; in other words, the springs 40 "take over" the job of collapsing the toggle so that no further energy need be supplied by the operator. Moreover, the expansion of the springs 40 acts to compress the springs 80 and to store energy in the latter. Once the movable shoes pass by the stationary shoes, the operator simply releases the foot treadle so that the energy stored in the springs 80 is then effective to restore the toggle to the "on center" condition in readiness for subsequent braking.

We claim as our invention:

1. In a press for operating a pair of dies, the combination comprising a frame, a crankshaft having a crank for reciprocating one of the dies relative to the other, a constantly driven flywheel mounted for rotation coaxially with said crankshaft, a clutch mounting plate keyed to said crankshaft for rotation adjacent said flywheel, a clutch member on said mounting plate for bodily rotation therewith, said clutch member having provision for limited movement toward and away from the flywheel and normally biased against said flywheel for clutching the flywheel to the crankshaft, a first brake shoe mounted on said frame blocked against rotational movement, a second brake shoe mounted on said clutch member, said brake shoes being tapered so that upon engagement thereof said clutch member is braked to a stop accompanied by wedging movement of the clutch member away from said flywheel to break the clutch connection with the crankshaft, and means including a manual control member for momentarily retracting the stationary brake shoe for initiating a cycle of rotation of the crankshaft.

2. In a press for operating a pair of dies, the combination comprising a frame, a crankshaft having a crank for reciprocating one of the dies relative to the other, a constantly driven flywheel mounted for rotation coaxially with said crankshaft, a clutch mounting plate keyed to said crankshaft for rotation adjacent said flywheel, a clutch member on said mounting plate for bodily rotation therewith, said clutch member having provision for limited movement toward and away from the flywheel and normally biased against said flywheel so that the flywheel is clutched to the crankshaft, a first brake shoe mounted on said frame blocked against rotational movement, a second brake shoe mounted for rotation with the crankshaft and mechanically coupled to said clutch member, said brake shoes having tapered faces arranged in obstructing relation so that upon engagement thereof the crankshaft is braked to a stop accompanied by wedging of the clutch member away from said flywheel against the force of bias thereby to declutch the crankshaft from the flywheel, and means including a manual control member for momentarily retracting the stationary brake shoe from its obstructing position so that the clutch member is free to engage the flywheel thus initiating a cycle of rotation of the crankshaft.

3. In a press for operating a pair of dies, the combination comprising a frame, a crankshaft having a crank for reciprocating one of the dies relative to the other, a constantly driven flywheel mounted for rotation coaxially with said crankshaft, a clutch mounting plate keyed to said crankshaft for rotation adjacent said flywheel, a clutch member on said mounting plate for bodily rotation therewith, said clutch member having provision for limited movement toward and away from the flywheel and normally biased against said flywheel so that the flywheel is clutched to the crankshaft, a first brake shoe mounted on said frame blocked against rotational movement, a second brake shoe mounted for rotation with the crankshaft and mechanically coupled to said clutch member, said brake shoes having tapered faces arranged in obstructing relation so that upon engagement thereof the crankshaft is braked to a stop accompanied by wedging of the clutch member away from said flywheel against the force of bias thereby to declutch the crankshaft from the flywheel, and means including a manual control member for momentarily retracting the stationary brake shoe from its obstructing position so that the clutch member is free to engage the flywheel thus initiating a cycle of rotation of the crankshaft, a toggle interposed between the stationary brake shoe and the frame for rigidly supporting said brake shoe, and means including a manual control member for momentarily breaking said toggle for initiating a cycle of rotation of the crankshaft.

4. In a press for operating a pair of dies, the combination comprising a frame, a crankshaft journaled in said frame and having a crank for reciprocating the dies relative to one another, a constantly driven flywheel coaxial with said crankshaft, a clutch member bodily carried by said crankshaft but movable with respect to it through a limited range, spring means interposed between the crankshaft and the clutch member for biasing the clutch member against the flywheel for rotation of the crankshaft, a brake having a first brake shoe coupled to said clutch member and a second brake shoe which is mounted against rotation with respect to said frame, a toggle interposed between the frame and said second brake shoe, the faces of said brake shoes being tapered and arranged in interfering relation when the toggle is substantially "on center" for stopping the latter and for simultaneously wedging the clutch member out of contact with said flywheel, means for biasing the toggle to its "on center" condition, and means including a manual operator acting upon said toggle against the force of bias for momentarily breaking the toggle thereby to initiate a cycle of revolution of said crankshaft.

5. In a press for operating a pair of dies, the combination comprising a frame, a crankshaft journaled in said frame and having a crank for reciprocating the dies relative to one another, a constantly driven flywheel coaxial with said crankshaft, clutch means bodily carried by said crankshaft but movable with respect to it through a limited range, means interposed between the crankshaft and the clutch means for biasing the clutch means against the flywheel for rotation of the crankshaft, first and second brakes located in diametrical positions with respect to said crankshaft, each of said brakes having a first brake shoe coupled to said clutch member and a second brake shoe which is mounted against rotation with respect to said frame, toggles interposed between the frame and said second brake shoes respectively, the faces of said brake shoes being tapered and arranged in interfering relation when the toggles are substantially "on center" for stopping the latter and for simultaneously wedging the clutch means out of contact with said flywheel, means for biasing the toggles to their "on center" conditions, means including a manual operator acting upon said toggles against the force of bias for momentarily breaking the toggles to initiate rotation of the crankshaft, and means for insuring that engagement of the brake shoes occurs only between brake shoes comprising a pair thereby to insure a full revolution of said crankshaft once its motion is initiated.

References Cited in the file of this patent

UNITED STATES PATENTS

| | | |
|---|---|---|
| 1,407,384 | Crowley | Feb. 21, 1922 |
| 2,023,772 | Russo | Dec. 10, 1935 |
| 2,111,143 | Geldhof | Mar. 15, 1938 |
| 2,122,594 | Stewart | July 5, 1938 |
| 2,571,303 | Spiller et al. | Oct. 16, 1951 |
| 2,663,384 | Chamberlain | Dec. 22, 1953 |
| 2,825,434 | Smitzer | Mar. 4, 1958 |
| 2,971,620 | Rice | Feb. 14, 1961 |

FOREIGN PATENTS

| | | |
|---|---|---|
| 1,086,273 | France | Oct. 11, 1954 |